United States Patent [19]

Gergen et al.

[11] Patent Number: 4,956,412

[45] Date of Patent: Sep. 11, 1990

[54] POLYMER BLEND

[75] Inventors: William P. Gergen, Houston, Tex.; Robert G. Lutz, Santa Rosa, Calif.; William W.C. Hart, Avon, Conn.

[73] Assignee: Shell Oil Company, Houston, Tex.

[21] Appl. No.: 269,033

[22] Filed: Nov. 9, 1988

[51] Int. Cl.$^5$ .................. C08L 73/00; C08L 35/06
[52] U.S. Cl. ................................ 525/190; 525/185
[58] Field of Search ............................ 525/185, 190

[56] References Cited

U.S. PATENT DOCUMENTS

| | | | |
|---|---|---|---|
| 2,495,286 | 1/1950 | Brubaker | 260/63 |
| 3,264,272 | 8/1966 | Rees | 260/78.5 |
| 3,325,458 | 6/1967 | Kim et al. | 260/80.5 |
| 3,336,276 | 8/1967 | Kim et al. | 260/80.73 |
| 3,404,134 | 10/1968 | Rees | 260/78.5 |
| 3,426,102 | 2/1969 | Solak et al. | 260/879 |
| 3,451,538 | 6/1969 | Trementozzi | 206/46 |
| 3,538,194 | 11/1970 | Barrett et al. | 260/879 |
| 3,540,577 | 11/1970 | Trementozzi et al. | 206/46 |
| 3,580,974 | 5/1971 | Lee et al. | 260/876 R |
| 3,586,737 | 6/1971 | Duke et al. | 260/879 |
| 3,634,547 | 1/1972 | Rose et al. | 260/876 R |
| 3,652,731 | 3/1972 | Coffey et al. | 260/879 |
| 3,671,607 | 6/1972 | Lee | 260/876 R |
| 3,694,412 | 9/1972 | Nozaki | 260/63 |
| 3,780,140 | 12/1973 | Hammer | 525/185 |
| 3,951,932 | 4/1976 | Coffey | 526/85 |
| 4,287,318 | 9/1981 | Bracke et al. | 525/313 |
| 4,657,976 | 4/1987 | Ott | 525/190 |
| 4,801,648 | 1/1989 | Fink | 525/80 |

FOREIGN PATENT DOCUMENTS

| | | |
|---|---|---|
| 121965 | 10/1984 | European Pat. Off. . |
| 181014 | 5/1986 | European Pat. Off. . |
| 222454 | 5/1987 | European Pat. Off. . |
| 1081304 | 8/1967 | United Kingdom . |

*Primary Examiner*—John C. Bleutge
*Assistant Examiner*—David Buttner

[57] ABSTRACT

Polymer blends of improved properties are produced by uniformly mixing a linear alternating polymer of carbon monoxide and at least one ethylenically unsaturated hydrocarbon, and a copolymer of a vinyl aromatic monomer and an alkenyl nitrile.

9 Claims, No Drawings

POLYMER BLEND

FIELD OF THE INVENTION

This invention relates to improved polymer blends comprising a major proportion of a linear alternating polymer of carbon monoxide and at least one ethylenically unsaturated hydrocarbon. More particularly, it relates to blends of the linear alternating polymer with certain copolymers of vinyl aromatic monomers and nitrilic monomers.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical initiators, e.g., peroxy compounds. U.K. No. 1,018,304 produced similar polymers of higher carbon monoxide content in the presence of alkylphosphine complexes of palladium salts as catalyst. Nozaki extended the process to the production of linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, e.g., ethylene or ethylene and propylene, has become of greater interest in part because of the greater availability of the polymers. These polymers, often referred to as polyketones or polyketone polymers, have been shown to be of the repeating structure $-CO+A\text{+}$ where A is the moiety of the unsaturated hydrocarbon polymerized through the ethylenic unsaturation. For example, when the ethylenically unsaturated hydrocarbon is ethylene, the polymer is of the repeating formula $-CO+CH_2-CH_2\text{+}-$. The general process for the production of such polymers is illustrated by a number of published European patent applications Nos. including 0,121,965 and 0,181,014. The process generally involves the use of a catalyst composition formed from a compound of the Group VIII metals palladium, cobalt or nickel, the anion of a non-hydrohalogenic acid having a pKa below 2 and a bidentate ligand of phosphorus, arsenic or antimony.

The resulting polymers are relatively high molecular weight thermoplastics having utility in the production of shaped articles such as containers for the food and drink industry and parts for the automotive industry. For some particular applications it has been found to be desirable to have properties of a polymeric composition which are somewhat different from those of the polyketone polymer. It would be of advantage to retain the more desirable properties of the polyketone polymer and yet improve other properties. These advantages are often obtained through the provision of a polymer blend.

SUMMARY OF THE INVENTION

The invention contemplates the provision of blends of linear alternating polymers of carbon monoxide and at least one ethylenically unsaturated hydrocarbon with other polymeric material. More particularly, there is provided according to the invention a blend of the linear alternating polymer with copolymers of vinyl aromatic monomers and nitrilic monomers, which blend demonstrates increased modulus over the linear alternating polymer. A small amount of an acid polymer or a fatty acid stearate is added as a processing aid.

DESCRIPTION OF THE INVENTION

The polyketone polymers which are employed as the major component of the blends of the invention are linear alternating polymers of carbon monoxide and at least one ethylenically unsaturated hydrocarbon. Suitable ethylenically unsaturated hydrocarbons for use as precursors of the polyketones have up to 20 carbon atoms inclusive, preferably up to 10 carbon atoms inclusive, and are aliphatic such as ethylene and other α-olefins including propylene, butylene, isobutylene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketones are copolymers of carbon monoxide and ethylene or are terpolymers of carbon monoxide, ethylene and a second hydrocarbon of at least 3 carbon atoms, particularly an α-olefin such as propylene.

The structure of the polyketone polymers is that of a linear alternating polymer of carbon monoxide and ethylenically unsaturated hydrocarbon and the polymer will contain substantially one molecule of carbon monoxide for each molecule of unsaturated hydrocarbon. When terpolymers of carbon monoxide, ethylene and a second hydrocarbon are employed in the blends of the invention there will be within the terpolymer at least two units incorporating a moiety of ethylene for each unit incorporating a molecule of the second hydrocarbon, preferably from about 10 units to about 100 units incorporating a moiety of ethylene for each unit incorporating a moiety of the second hydrocarbon. The polymer chain is therefore illustrated by the formula

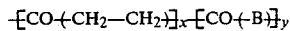

where B is the moiety obtained by polymerization of the second hydrocarbon through the ethylenic unsaturation. The $-CO-CH_2-CH_2-$ units and the $-CO-B-$ units are found randomly throughout the polymer chain and the ratio of y:x is no more than about 0.5. In the modification of the invention where copolymers are employed the second hydrocarbon is not present and the polymers are represented by the above formula wherein y=0. When y is other than 0, as in the case of terpolymers, ratios of y:x from about 0.01 to about 0.1 are preferred. The end groups or "caps" of the polymer chain will depend on what materials are present during the production of the polymer and whether and how the polymer was purified. The precise nature of the end groups is of little significance with regard to the overall properties of the polymer so that the polymer is fairly represented by the above formula. Of particular interest are the polyketone polymers of molecular weight from about 1,000 to about 200,000, particularly those polyketone polymers of number average molecular weight from about 20,000 to about 90,000 as determined by gel permeation chromatography. The physical properties of such polymers will depend in part on whether the polymer is a copolymer or a terpolymer and the relative proportion of the second hydrocarbon present in the case of terpolymers. Typical melting points of such polymers are from about 175° C. to about 300° C., more preferably from about 210° C. to about 270° C.

A method of producing polyketone polymers which is now becoming conventional is to contact the carbon monoxide and the unsaturated hydrocarbon(s) in the presence of a palladium compound, a non-hydrohalogenic acid having a pKa below about 6 and a bidentate ligand of phosphorus. The scope of the process for the production of polyketone polymer is extensive. Without wishing to be limited, a preferred palladium compound is a palladium carboxylate, particularly palladium acetate, the preferred anion is the anion of trifluoroacetic acid or p-toluenesulfonic acid and the preferred bidentate ligand is 1,3-bis(diphenylphosphino)propane or 1,3-bis[di(2-methoxyphenyl)phosphino]propane. Such a process for polyketone production is illustrated by copending U.S. patent application Ser. No. 930,468, filed Nov. 14, 1986.

Polymerization is conducted under polymerization conditions in the gaseous phase or in a liquid phase in the presence of a reaction diluent such as a lower alkanol, e.g., methanol or ethanol. The reactants and catalyst composition are contacted by conventional means such as shaking or stirring. Suitable reaction temperatures are from about 20° C. to about 150° C. with preferred temperatures being from about 50° C. to about 135° C. Typical reaction pressures are from about 1 bar to about ZOO bar, more typically from about 10 bar to about 100 bar. Subsequent to reaction the polymer product is recovered as by filtration or decantation. The polymer product may contain residues of the catalyst which are removed, if desired, by treatment with a solvent or a complexing agent which is selective for the residues.

The vinyl aromatic/nitrilic copolymers of the blends of the invention are well known in the art and comprise vinyl aromatic monomers of up to 10 carbon atoms inclusive, and α,β-ethylenically unsaturated alkenyl nitrile monomers of up to 8 carbon atoms inclusive. The copolymers typically have an alkenyl nitrile content below about 40% by weight of the copolymers.

The vinyl aromatic monomer component of the vinyl aromatic/nitrilic copolymer is preferably of the formula

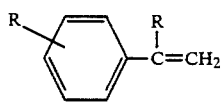

wherein R independently is hydrogen or alkyl of up to 2 carbon atoms inclusive. Illustrative of such vinyl aromatic compounds are styrene, α-methylstyrene, α-ethylstyrene, o-methylstyrene and p-ethylstyrene. Styrene and α-methylstyrene are preferred vinyl aromatic compounds of the above formula, particularly styrene.

The α,β-ethylenically unsaturated alkenyl nitrile monomer component of the vinyl aromatic/nitrilic copolymer is preferably of the formula

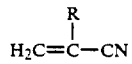

wherein R is hydrogen or alkyl of up to 2 carbon atoms inclusive. These nitriles are acrylonitrile, methacrylonitrile and ethacrylonitrile. Preferred nitriles of the above formula are acrylonitrile and methacrylonitrile and particularly preferred is acrylonitrile.

The preferred styrene/acrylonitrile copolymers are commercially available with an acrylonitrile content of from about 20 to about 35% by weight of the copolymer. These polymers are marketed by Dow under the tradename TYRIL® styrene/acrylonitrile polymers (SAN).

Processing of the blend is facilitated by addition of less than 5%, preferably less than about 1%, by weight of an acid polymer or a fatty acid stearate such as glycerol monostearate. The acid polymer is preferably an α-olefin/unsaturated carboxylic acid polymer. The acid polymer may be a partial non-alkali metal salt of the α-olefin/unsaturated carboxylic acid polymer. By the term partial non-alkali metal salt is meant that some but not all of the carboxylic acid moieties have been neutralized with zinc, aluminum, or magnesium as further discussed below. Because the partially neutralized material retains ionic character while being polymeric in form, the material is often referred to as a metal ionomer.

The α-olefin component of the acid polymer is preferably an α-olefin of up to 10 carbon atoms inclusive such as ethylene, propylene, 1-butene, 1-octene and 1-decene. Preferred α-olefins are straight chain α-olefins of up to 4 carbon atoms inclusive and particularly preferred is ethylene. The α-olefin component of the acid polymer is present in at least 80% by mol based on the total base or non-neutralized polymer, and preferably present in at least 90% by mol on the same basis.

The unsaturated carboxylic acid component of the acid polymer is preferably an α,β-ethylenically unsaturated carboxylic acid of up to 10 carbon atoms inclusive and is illustrated by acrylic acid, 2-hexenoic acid, 2-octenoic acid and 2-decenoic acid. The preferred α,β-ethylenically unsaturated carboxylic acids have up to 4 carbon atoms inclusive. These are acrylic acid, methacrylic acid and crotonic acid, of which, methacrylic acid is preferred. The unsaturated carboxylic acid monomer content of the acid polymers is from about 1% by mol to about 20% by mol based on the base or non-neutralized polymer. Amounts of carboxylic acid from about 9% by mol to about 15% by mol on the same basis are preferred. Certain of these acid polymers are commercially available and are marketed under the trademarks PRIMACOR polymers and NUCREL polymers.

The metal ionomer of the acid polymers is produced by reacting the α-olefin/unsaturated carboxylic acid polymer with a source of the ionizable metal compound sufficient to neutralize from about 10% to about 90% of the carboxylic acid groups present in the polymer. Such neutralization with the metal compound results in a uniform distribution of the metal throughout the polymer. Neutralization of from about 20% to about 80% of the carboxylic acid groups is preferred and neutralization of from about 35% to about 75% of the carboxylic acid groups is particularly preferred. The metal ions suitably employed in the partial neutralization are uncomplexed non-alkali metal ions including zinc ions, aluminum ions, and magnesium ions which are provided in compounds of the type often referred to as metal salts, e.g., zinc chloride, zinc acetate and zinc formate, or are complexed metal ions wherein the metal is bonded to two types of groups, at least one of which is readily ionized from the metal and the other is not. Illustrative of such complexed metal ions are mixed zinc salts with one weak acid such as oleic acid or stearic acid and one more ionizable acid such as acetic acid or formic acid. In general, neutralization with a complexed zinc ion is most preferred. Methods of producing the metal ionomers are known in the art and are disclosed in U.S. Pat. No. 3,264,272 and U.S. Pat. No. 3,404,134 which are incorporated herein by reference. Certain of these partially neutralized acid polymers, i.e., the metal ionomers, are commercially available and are marketed under the trademark SURLYN® by DuPont.

The blends of the invention are predominantly polyketone with a lesser quantity of the vinyl aromatic/nitrilic copolymer. The precise percentage of the vinyl aromatic/nitrilic copolymer to be employed in the blends of the invention is not critical and percentages from about 0.5% by weight to about 35% by weight, based on total blend, of the vinyl aromatic/nitrile copolymer are believed to be satisfactory.

The method of producing the blend of polyketone polymer and vinyl aromatic/nitrilic polymer is not material so long as a uniform blend is produced without undue degradation of the blend or its components. In one modification the polymer components of the blend are extruded in a corotating twin screw extruder to produce the blend. In an alternate modification, the polymer components are blended in a mixing device which exhibits high shear.

The blends of the invention are non-miscible blends having increased modulus over the polyketone polymer. The blends will not, of course, be homogeneous but good results are obtained when uniform mixtures of the dispersed phase in the continuous phase are obtained.

The blends of the invention may also include conventional additives such as antioxidants and stabilizers, fillers and fire resistant materials, mold release agents, colorants and other materials designed to improve the processability of the polymers or the properties of the resulting blend. Such additives are added by conventional methods prior to, together with or subsequent to the blending of the polyketone and the vinyl aromatic/nitrilic polymer.

The blends are processed by conventional methods such as extrusion and injection molding into sheets, films, plates and shaped parts. Illustrative of such applications are the production of internal as external parts for automotive use.

The invention is further illustrated by the following Illustrative Embodiments which should not be regarded as limiting.

COMPARATIVE EXAMPLE I

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer was 230° C. and the polymer had a limiting viscosity number (LVN) of 1.6 when measured in m-cresol at 60° C. A small amount of IRGANOX 1076, a conventional hindered phenolic antioxidant, was added as a stabilizer.

The terpolymer was extruded in a twin screw Baker Perkins extruder at 256° C. and 300 rpm then injection molded at 260° C. and 700 psi for measurement of impact strength and room temperature tensile properties. The molded sample had a notched Izod impact strength of 2.7 ft. lbs/in, a tangent modulus of 227,000 and other tensile properties as shown in Table I.

COMPARATIVE EXAMPLE II

A terpolymer of CO/ethylene/propylene was prepared as described in Comparative Example 1 with the exception that 1% by weight of SURLYN 9520 was added as a processing aid and 0.5% by weight of ETHANOX 330 was added as an antioxidant. Polymer extrusion and molding was conducted at the same conditions except that the extrusion temperature was 253° C. The molded sample had a notched Izod impact strength of 3.3 ft. lbs/in, a tangent modulus of 224,000 and other tensile properties as shown in Table I.

ILLUSTRATIVE EMBODIMENT I

A molded sample of a blend of the polyketone polymer of Comparative Example 1 and 20% by weight (based on total blend) of Dow's TYRIL-1000B styrene/acrylonitrile polymer was produced with the same procedure as described in Comparative Example II except that the injection molding pressure was 450 psi. The polymer blend exhibited increased modulus in comparison to the polymers of Comparative Examples I and II. The molded sample had a notched Izod impact strength of 1.6 ft. lbs/in, a tangent modulus of 238,000 and other tensile properties as shown in Table I.

TABLE I

| Polymer | Room Temperature Tensile Properties | | | |
|---|---|---|---|---|
| | Tangent Modulus | Yield Stress psi | Tensile @ Break, psi | Elongation @ Break, % |
| Comparative Example I | 227,000 | 9,100 | 7,500 | 97 |
| Comparative Example II | 224,000 | 9,200 | 8,500 | 89 |
| Illustrative Embodiment I | 238,000 | 8,900 | 8,800 | 14 |

What is claimed is:

1. A composition comprising a non-miscible blend of:
    a linear alternating polymer of carbon monoxide and at least one ethylenically unsaturated hydrocarbon, wherein the linear alternating polymer is represented by the formula

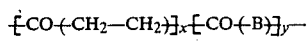

wherein B is the moiety of an ethylenically unsaturated hydrocarbon of at least 3 carbon atoms and the ratio of y:x is no more than about 0.5; and
    a copolymer of a vinyl aromatic monomer and an α,β-ethylenically unsaturated alkenyl nitrile, the alkenyl nitrile being present in an amount less than about 40% by weight of the copolymer, which is present in an amount between 0.5% and 35% by weight of the composition.

2. The composition of claim 1 wherein the α,β-ethylenically unsaturated alkenyl nitrile is of the formula

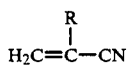

wherein R is hydrogen or alkyl of from 1 to 2 carbon atoms inclusive, and the vinyl aromatic monomer is of the formula

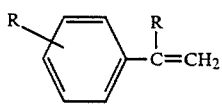

wherein R independently is hydrogen or alkyl of from 1 to 2 carbon atoms inclusive.

3. The composition of claim 2 wherein the alkenyl nitrile is acrylonitrile and the vinyl aromatic monomer is styrene, the acrylonitrile being present in an amount between about 20% to about 35% by weight of the copolymer.

4. The composition of claim 1 wherein y=0.

5. The composition of claim 1 wherein B is a moiety of propylene and the ratio of y:x is from about 0.01 to about 0.1.

6. The composition of claim 1 further comprising a processing aid in an amount less than 5% by weight of the composition.

7. The composition of claim 6 wherein the processing aid is an amount of an acid polymer less than about 1% by weight of the composition.

8. The composition of claim 1 wherein the linear alternating polymer is produced by reacting the carbon monoxide and the ethylenically unsaturated hydrocarbon in the presence of a catalyst composition comprising a palladium compound, a non-hydrohalogenic acid having a pKa below about 6, and a bidentate ligand of phosphorus.

9. The composition of claim 8 wherein the bidentate ligand is 1,3-bis[di(2-methoxyphenyl)phosphino]propane.

* * * * *